Dec. 3, 1963   R. J. BROADWELL   3,112,769
VALVE MECHANISM
Filed March 24, 1960   4 Sheets-Sheet 1

INVENTOR
ROBERT J. BROADWELL
BY Cushman, Darby & Cushman
ATTORNEYS

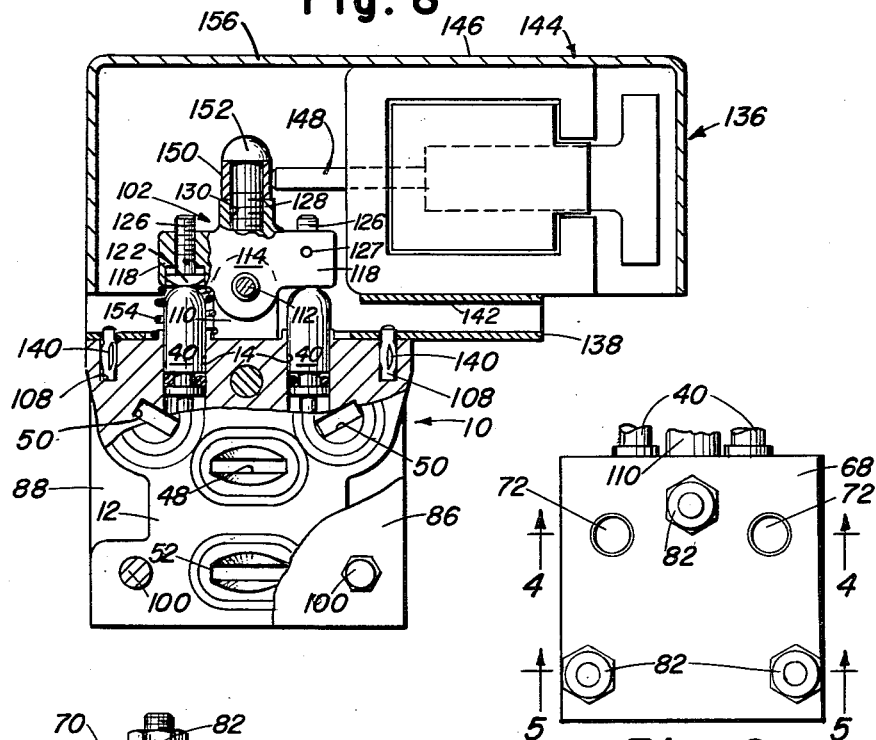
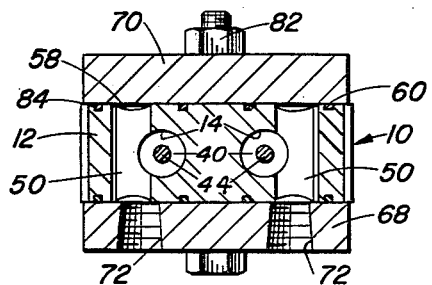
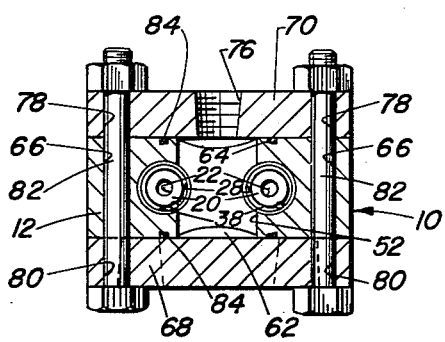
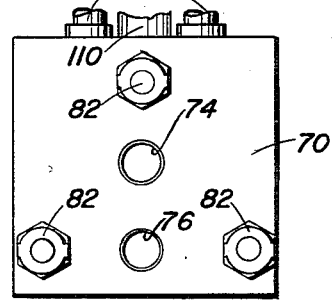

Dec. 3, 1963  R. J. BROADWELL  3,112,769
VALVE MECHANISM
Filed March 24, 1960  4 Sheets-Sheet 3

INVENTOR
ROBERT J. BROADWELL
BY Cushman, Darby & Cushman
ATTORNEYS

Dec. 3, 1963    R. J. BROADWELL    3,112,769
VALVE MECHANISM
Filed March 24, 1960    4 Sheets-Sheet 4

INVENTOR
ROBERT J. BROADWELL
BY Cushman, Darby & Cushman
ATTORNEYS

United States Patent Office 3,112,769
Patented Dec. 3, 1963

3,112,769
VALVE MECHANISM
Robert J. Broadwell, Cleveland, Ohio, assignor, by mesne assignments, to Aurora Corporation of Illinois, Chicago, Ill., a corporation of Illinois
Filed Mar. 24, 1960, Ser. No. 17,363
31 Claims. (Cl. 137—627.5)

This invention relates to valve mechanisms and more particularly to valve mechanisms useful in industrial installations and the like for controlling fluid flow. This application constitutes a continuation-in-part of my copending application Serial No. 814,065, filed May 18, 1959.

In the above-mentioned application, there is disclosed a valve mechanism which comprises a valve body provided with a pair of parallel valve cavities, each of which defines an annular valve seat. Mounted within each of the cavities is a first valve member arranged to engage the associated valve seat, each first valve member having a longitudinally extending passage formed therein, which passage is provided with an annular valve seat. Each cavity also has mounted therein a second valve arranged to engage the passageway seat of the associated first valve member. The valve body itself is formed with a high pressure port, a low pressure port, and a working port which communicate respectively with the valve cavities. In the construction disclosed in my co-pending application, the ports were formed by bores extending inwardly of the valve body from one surface thereof, the outer extremity of the ports being threaded to receive conventional conduit connectors or the like. With this arrangement, the valve mechanism was adaptable to only one conduit connection arrangement so that if a particular installation required a specifically different conduit connection arrangement, the valve mechanism had to be especially constructed to accommodate the same, thus materially increasing the overall cost of production.

It has been found that by extending the ports completely through the valve body and providing the conduit connections in plates mounted on opposite sides of the valve body a much more economical and versatile valve mechanism is provided. That is, with this arrangement the valve body readily lends itself to be simply adapted by the utilization of outer plates of different configuration to accommodate any particular conduit arrangement. Moreover, by constructing the valve body in the manner indicated above, plural valve mechanism arrangements can be much more readily effected.

Accordingly, it is an object of the present invention to provide a valve mechanism assembly or unit of the type described which is universally adapted for use in any desired conduit arrangement.

Another object of the present invention is the provision of a valve mechanism unit of the type described arranged to receive conduit adapter plates on opposite sides thereof whereby through the selection of suitable plates the valve unit is rendered applicable to connection with any desired conduit arrangement.

A further object of the present invention is the provision of a valve mechanism unit of the type described having improved means for providing a seal between the ends of the through ports thereof and the adjacent surfaces of the adapter plates.

In the above-mentioned co-pending application, there is disclosed various different instrumentalities for actuating the valve mechanism, as, for example, a manual control lever, a cam follower, and an electrical solenoid. In the arrangement disclosed, the structure of the valve mechanism was such that component elements of the valve mechanism had to be modified in order to convert the valve mechanism from one type of actuation to another. Thus, where one customer desired solenoid actuation, the basic elements of the valve mechanism itself had to be specifically formed for this particular operation and a similar situation existed with respect to manual operation and cam operation, thus materially increasing the overall cost of production.

Accordingly, it is a further object of the present invention to provide a valve mechanism unit having improved means for receiving various types of actuating mechanisms or instrumentalities thus rendering it possible to produce a basic valve mechanism unit without regard to the particular type of actuation and to subsequently equip the basic unit with any desired type of actuating mechanism.

A still further object of the present invention is the provision of a valve mechanism which is simple in construction, efficient in operation and economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

FIGURE 2 is a reduced fragmentary front elevational view of the valve mechanism unit having one set of conduit receiving adapter plates mounted thereon;

FIGURE 3 is a rear elevational view of the structure shown in FIGURE 2;

FIGURE 4 is a cross-sectional view taken along the line 4—4 of FIGURE 2;

FIGURE 5 is a cross-sectional view taken along the line 5—5 of FIGURE 2;

FIGURE 8 is a front elevational view of a valve mechanism embodying the principles of the present invention having a single solenoid actuating mechanism applied thereto;

Figures 1, 12:
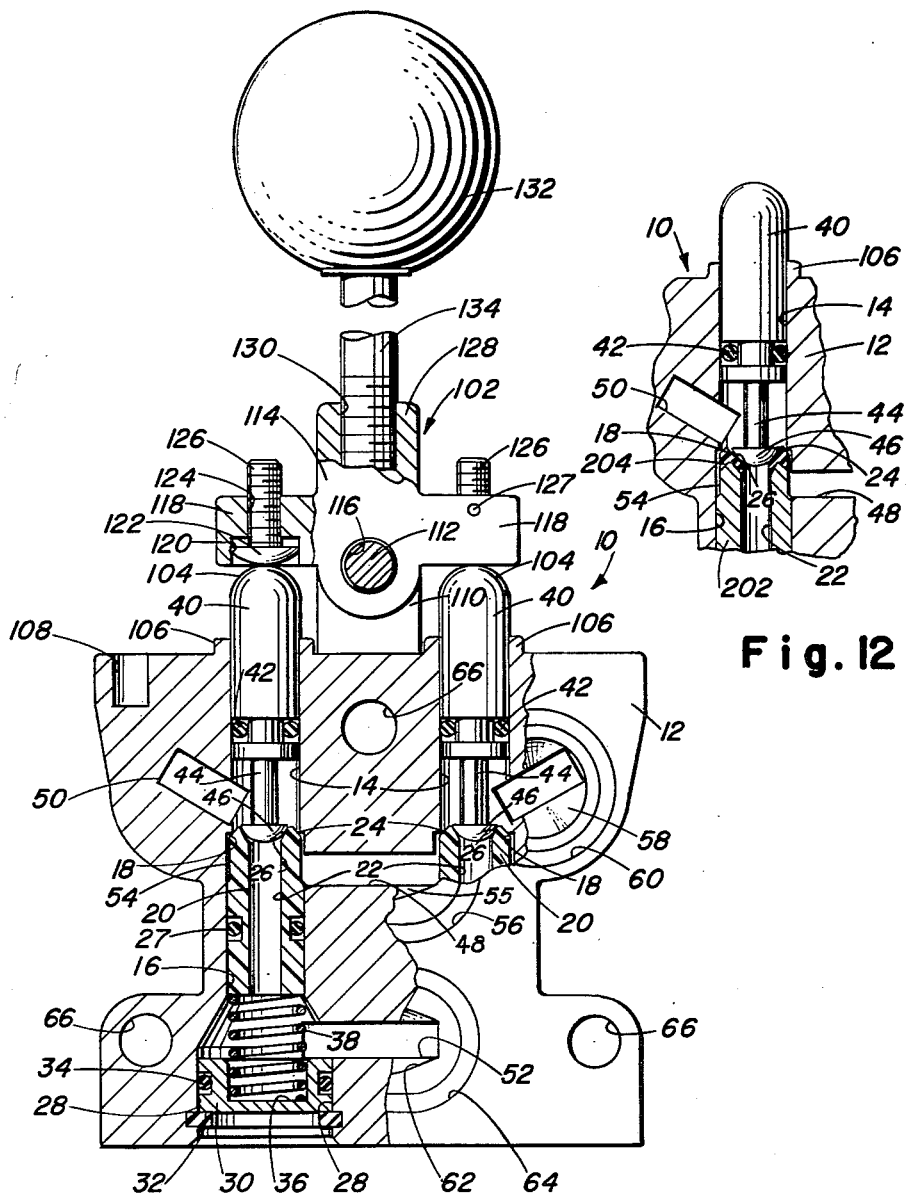
FIGURE 1 is a front elevational view, partly broken away, of a valve mechanism unit embodying the principles of the present invention, showing a manual actuating lever applied thereto.
FIGURE 12 is a fragmentary view showing a modified form of the first valve member of the unit.

Referring now more particularly to FIGURE 1 of the drawings, there is shown therein a basic valve mechanism unit, generally indicated at 10, which embodies the principles of the present invention. The valve mechanism unit 10 is arranged to cooperate with means providing conduit connections for various conduit arrangements and is arranged to have applied thereto various actuating mechanisms so that, in production, the valve mechanism unit can be mass produced in quantity regardless of the particular requirements and then subsequently equipped in accordance with the customers' desires, thus materially reducing the production costs as compared with valve mechanisms which must be basically altered or separately manufactured for specific applications.

As shown in FIGURE 1, the basic valve mechanism unit 10 includes a valve body 12 of any suitable material, a preferred material being cast aluminum alloy. Formed in the valve body is a valve cavity in the form of a pair of parallel bores 14 extending therethrough, each bore having a counterbore 16 formed in one end thereof defining an annular shoulder 18 which forms a valve seat between each bore 14 and counterbore 16. Slidably mounted within each counterbore 16 is a valve member 20 having a central port or passageway 22 extending longitudinally or axially therethrough. The end of each valve member 20 adjacent the valve seat 18 is formed with an outwardly facing outer frusto-conical surface 24 which is arranged to engage the associated valve seat 18 with a substantial line contact and an inwardly facing inner frusto-conical surface 26 forming a valve seat in the associated passageway 22. In order to prevent leakage past the periphery of each valve member 20 within the associated counterbore 16, suitable sealing means is provided, such as an O-ring seal 27 mounted within an appropriate annular groove formed in the periphery of each valve member 20.

The outer extremity of each counterbore 16 has a second counterbore 28 formed therein within which a plug member 30 is mounted. Each plug member is secured within the associated counterbore 28 by any suitable means as, for example, a snap ring 32 arranged to fit within an appropriate annular groove formed in the counterbore 28. Preferably, suitable sealing means are provided on the plug to prevent leakage of fluid outwardly through the associated counterbore 28, as, for example, an O-ring seal 34 mounted in an appropriate annular groove formed in the periphery of the plug.

As shown in FIGURE 1, the plug member 30 is formed with an inwardly facing socket 36 arranged to receive one end of a compression spring 38 the opposite end of which engages the adjacent end of the associated valve member 20. It will be seen that the springs 38 serve to resiliently urge the valve members 20 upwardly, as shown in FIGURE 1, so that the surfaces 24 thereof will engage the valve seats 18.

Mounted within each of the bores 14 is a second valve member 40 preferably in the form of a plunger or the like and having suitable sealing means therein for engaging the wall of the associated bore 14, such as an O-ring seal 42 mounted within an appropriate annular groove formed in the periphery thereof. Extending downwardly and forming an integral part of each valve member 40 is a valve stem 44 having a segmental spherical valve element 46 integrally formed on the extremity thereof for engaging the valve seat formed by the frusto-conical surface 26 of the associated valve member 20.

The valve members 20 and 40 are arranged to control the flow of fluid from a high pressure port or opening 48 to a working port or opening 50 associated with each of the bores 14 and from the working ports to a low pressure port or opening 52. The ports 48, 50 and 52 extend completely through the valve body in a direction transverse to the extent of the valve cavities formed by the bores 14 and the counterbores 16. The high pressure port 48 is of elongated rectangular cross-sectional configuration and is formed within the valve body between the counterbores 16 thereof adjacent the valve seats 18. As shown in FIGURE 1, the ends of the rectangular high pressure port 48 communicate with both counterbores 16 at positions adjacent the valve seats 18, the periphery of the adjacent end portion of the valve members 20 being relieved, as indicated at 54, to permit flow thereby. Preferably, the outer surfaces of the valve body 12 adjacent port 48 are also relieved, as indicated at 55, by the provision of substantially elliptical depressions or the like. Surrounding each depression 55 is an annular groove 56 of elliptical or oval configuration.

Each working port 50 is preferably also of rectangular configuration in cross-section and is disposed in the valve body 12 outwardly of the associated bore 14 with one end thereof in communication with the bore adjacent the associated valve seat 18. The outer surfaces of the valve body 12 adjacent each of the working ports 50 are relieved, as indicated at 58, by the provision of substantially circular depressions. Surrounding each circular depression 58 is an annular groove 60 of circular configuration.

The low pressure port 52 is preferably formed with an elongated rectangular cross-sectional configuration similar to the configuration of the high pressure port 48 and is disposed within the valve body 12 in parallel relationship to the high pressure port 48 between the second counterbore 28 with its ends respectively in communication therewith. As before, the outer surfaces of the valve body adjacent the port 52 are relieved, as indicated at 62, by substantially elliptical depressions and surrounding each depression 28 is an elliptical or oval annular groove 64.

It will be understood that the ports 48, 50, and 52 are adapted to be connected to a source of high pressure fluid, a working instrumentality, and source of low pressure fluid respectively. The provision of parallel through ports in the valve body 10 renders the valve mechanism unit 10 readily adaptable for connection with any desired conduit arrangement. For example, some installations require that all conduits be connected to the valve mechanism on one side thereof, other conduit arrangements require that the working ports be connected on one side of the valve mechanism unit while the high pressure and low pressure ports are connected on the opposite side thereof, still other arrangements may require one of the ports to be connected on one side and three of the ports on the other. With the present basic valve mechanism unit, these various requirements can be readily accommodated by the selection of suitable adapter plates or conduit receiving plates which are arranged to be mounted on opposite sides of the valve body 12. While such plates may be connected by any suitable means to the valve body, preferably, the valve body is provided with a plurality of bolt receiving apertures or openings 66 extending therethrough in a direction parallel with respect to the ports for this purpose.

Referring now more particularly to FIGURES 2-5, there is shown therein a pair of conduit receiving adapter plates 68 and 70 which can be utilized with the present basic valve mechanism unit 10 to accommodate one particular conduit arrangement. As shown in FIGURE 2, the plate 68 is provided with a pair of openings 72 which are disposed in a position to register with the working ports 50 of the valve body 12. As shown in FIGURE 4, the openings 72 may be interiorly threaded to receive conventional conduit connectors (not shown), having conduits (not shown) extending therefrom to a desired working instrumentality, as, for example, to opposite ends of a fluid actuated piston and cylinder unit (not shown).

As shown in FIGURE 3, the plate 70 is provided with a central aperture or opening 74 which is arranged to register with the high pressure port 48 of the valve body and a parallel opening or aperture 76 which is arranged to register with the low pressure port 52. As before, the openings 74 and 76 may be interiorly threaded to receive conventional conduit connectors (not shown) extending therefrom to a source of high pressure fluid such as a pump (not shown) and to a source of low pressure fluid such as a sump (not shown) respectively.

It will also be understood that the plate 68 includes a plurality of bolt receiving apertures or openings 78 which register with the openings 66 of the valve body and the plate 70 includes a corresponding plurality of bolt receiving openings 80. The openings 78 and 80 are arranged to receive suitable fastening elements, as for example, bolt assemblies 82 which serve to secure the plates in abutting relation to the valve body on opposite sides thereof. In order to prevent leakage of fluid between the various ports of the valve mechanism unit 10 and the associated plates 68 and 70, an annular sealing element 84 is disposed within each of the annular grooves 56, 60 and 64, such annular sealing elements engaging the interior surface of the associated plates 68 and 70.

Figures 6, 7:
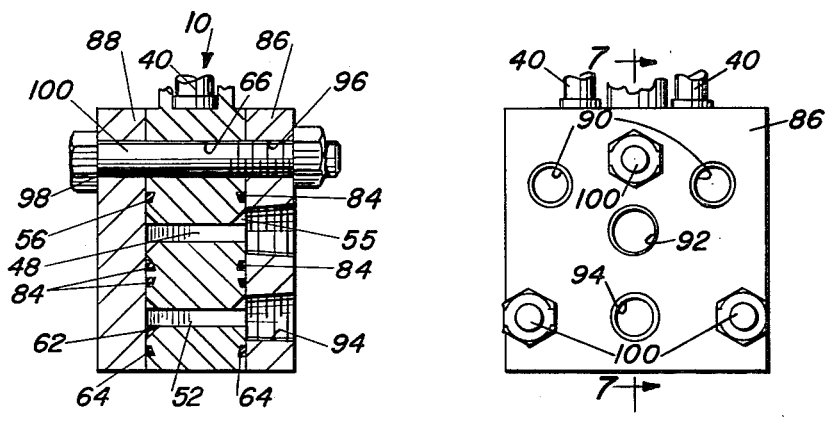
FIGURE 6 is a view similar to FIGURE 2 showing the valve mechanism unit having a modified form of conduit receiving adapter plates mounted thereon.
FIGURE 7 is a cross-sectional view taken along the lines 7—7 of FIGURE 6.

It will be seen that with the use of the plates 68 and 70, the conduit connections to the working instrumentality are provided on one side of the valve mechanism unit 10 while the conduit connections to the high pressure fluid source and low pressure fluid source are provided on the other side of the valve mechanism unit. Where the particular conduit arrangement requires all of the conduit connections to be disposed on one side of the valve mechanism unit, other adapter or conduit receiving plates may be utilized, such as plates 86 and 88, shown in FIGURES 6 and 7. As shown in FIGURE 6, the plate 86 is provided with a pair of working port communicating openings or apertures 90, a high pressure port communicating opening or aperture 92 and a low pressure port communicating opening or aperture 94 arranged therein to register with the working ports, high pressure port and low pressure port respectively of the valve unit 10. As before, each of the openings or apertures may be interiorly threaded to receive a conventional conduit connector.

In addition to the openings 90, 92 and 94 mentioned above, the plate 86 is also provided with a series of bolt receiving openings or apertures 96. The plate 88 is imperforate except for the provision of bolt receiving openings 98 and, as before, the plates 86 and 88 are secured in abutting relation on opposite sides of the valve body by suitable bolt assemblies 100 or the like extending through the registering openings 66, 96, and 98. Also as before, the annular sealing elements 84 provide for the prevention of leakage between the ports of the valve unit and the interior surface of the plates.

It will be understood that the cooperating plates 68 and 70 and cooperating plates 86 and 88 are merely exemplary of the various conduit arrangement which can be accommodated by different adapter plate combinations. For example, other cooperating plates could provide for the connection of one working port and the high pressure port on one side and the other working port and low pressure port on the other side. Other combinations and permutations will be readily apparent. For present purposes, the description of cooperating plates 68 and 70 and cooperating plates 86 and 88 are sufficient to clearly illustrate the advantages of the present basic valve mechanism unit. That is, the basic valve mechanism unit will be the same regardless of the particular requirements of the specific installation, thus permitting production standardization and minimizing the manufacturing cost of the basic valve mechanism unit. In order to accommodate particular requirements, it is merely necessary to select a particular cooperating adapter plate set which will satisfy the needs of the particular conduit arrangement.

The basic valve mechanism unit also provides a universal rocker arm assembly, generally indicated at 102, which renders the present basic valve unit suitable to receive any desired type of actuating mechanism. As shown in FIGURE 1, the valve members 40 extend outwardly of the bores 14 and have their outer extremities formed into a semi-spherical configuration, as indicated at 104. Preferably, a ring-like projection 106 is formed on the exterior surface of the valve body in surrounding relation to the outwardly extending end of each valve member 40. In addition, suitable fastening receiving apertures 108 are formed in the adjacent surface of the valve body at opposite ends thereof.

The rocker arm assembly 102 is pivotally mounted on the valve body 12 in a position to engage the surfaces 104 of the valve members 40 by any suitable means, such as a pair of integrally formed transversely spaced upstanding lugs 110 apertured to receive a pin 112 therethrough. The rocker arm assembly includes a rocker arm member 114 disposed between the lugs 110 and having a central aperture 116 formed therein for receiving the pin 112. Extending outwardly from the central portion of the rocker arm member is a pair of generally horizontally extending arm portions 118 each of which is provided with a socket-like opening 120 for receiving a valve member engaging element 122 preferably in the form of a head of a bolt having an arcuate surface for engaging the semi-spherical extremity 104 of the associated valve member 40. Extending through each arm portion 118 into communication with the associated opening 120 is an internally threaded aperture 124. Each bolt includes a shank 126 engaged within the threaded opening 124 and having its free end slotted to incrementally adjust the position of the associated head or valve member engaging element 122. Any suitable means may be provided for maintaining the bolts in their adjusted positions, for example the shanks 126 themselves may be formed with plugs of plastic which extend across the threads or such plastic plugs may be provided across the threads of the opening 124, as indicated at 127 in FIGURE 1. Extending upwardly from the central portion of the rocker arm 114 is a socket portion 128 having a central internally threaded opening 130 formed therein.

As indicated above, the rocker arm assembly 102 is adapted to receive various actuating instrumentalities or mechanisms and in FIGURE 1 there is shown one such instrumentality in the form of a manual control lever 132 including a stem 134 having its lower end exteriorly threaded to engage within the interiorly threaded opening 130 of the rocker arm member 114.

Referring now more particularly to FIGURE 8, there is shown therein a single solenoid actuating mechanism, generally indicated at 136, which can be utilized with the basic valve mechanism unit 10 of the present invention. As shown, the single solenoid actuating mechanism 136 includes a mounting plate 138 having a lower wall arranged to engage the upper surface of the valve body 12 and suitably apertured to receive the rocker arm assembly 102 and related structure of the basic valve mechanism unit extending upwardly from the upper surface of the valve body. The mounting plate 138 is secured to the upper surface of the valve body by any suitable means, such as fastening elements 140 extending through the lower wall of the mounting plate and into the openings 108 in the valve body.

The mounting plate 138 also includes an upper wall 142 arranged to receive and have secured thereto an electrical solenoid, generally indicated at 144. The solenoid 144 may be of any conventional design and includes the usual coil 146 having a plunger 148 extending outwardly therefrom which is adapted to be moved in a direction toward the left, as viewed in FIGURE 8 in response to the energization of the coil 146. The outer end of the plunger 148 is arranged to abut the exterior surface of a sleeve 150 mounted above the upwardly extending socket portion 128 of the rocker arm member 114, as by a stud 152 or the like extending through the sleeve and having its lower end engaged within the interiorly threaded opening 130 in the rocker arm member. In order to effect pivotal movement of the rocker arm assembly in a clockwise direction, as viewed in FIGURE 8 when the solenoid 144 is deenergized, there is provided a helical coil spring 154 having its lower end disposed in surrounding relation to the projection 106 associated with the left hand valve member 40, as shown in FIGURE 8, and its upper end in engagement with the lower surface of the associated arm portion 118 of the rocker arm member. Preferably, a cover member 156 of any suitable material, such as molded plastic or the like, is removably mounted over the rocker arm assembly and solenoid 144.

Figure 9:
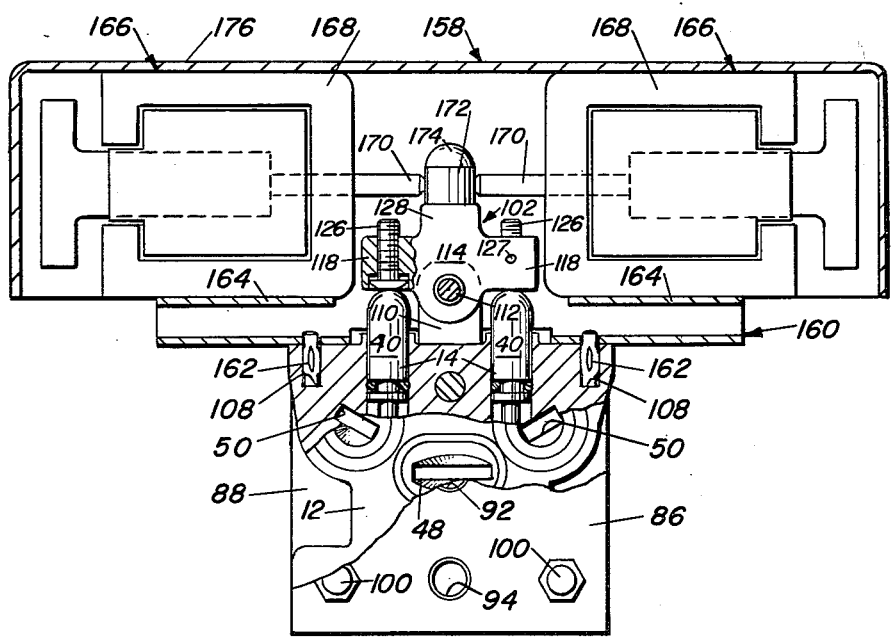
FIGURE 9 is a view similar to FIGURE 8 showing a dual solenoid actuating mechanism applied to the valve mechanism.

Referring now more particularly to FIGURE 9, there is shown therein a dual solenoid actuating mechanism, generally indicated at 158, which may be utilized with the basic valve mechanism unit 10 of the present invention. As shown, the dual solenoid actuating mechanism 158 includes a mounting plate 160 which is similar to the mounting plate 138 previously described and includes a lower apertured wall arranged to be secured to the upper surface of the valve body 12, as by fastening elements 162. The mounting plate includes a pair of spaced upper walls 164 extending from opposite ends of the valve body, each arranged to receive and have suitably secured thereto a solenoid, generally indicated at 166. As before, the solenoids 166 may be of any conventional construction and each includes the usual coil 168 and outwardly extending plunger 170. As shown, the solenoids are mounted on the upper walls of the mounting plate so that the plungers thereof extend toward each other to engage the exterior surface of a sleeve 172 on opposite sides thereof. The sleeve 172 is similar to the sleeve 150 previously described and is arranged to be mounted on the upwardly extending socket portion 128 of the rocker arm member 114 by means of a stud 174 extending through the sleeve and engaged within the interiorly threaded opening 130. As before, a plastic cover member 176 is removably secured over the solenoids 166 and associated rocker arm assembly 102.

Figure 11:
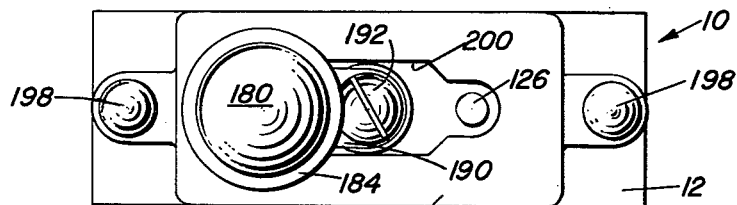
FIGURE 11 is a top plan view of the structure shown in FIGURE 11.
Figure 10:
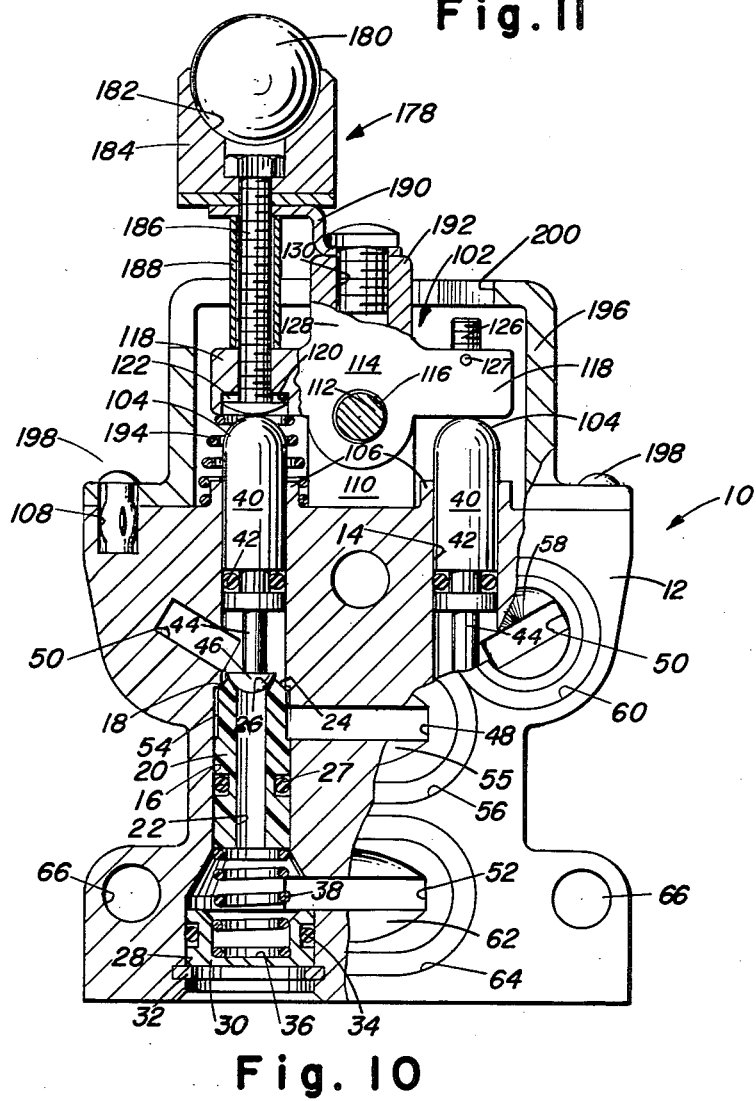
FIGURE 10 is a view similar to FIGURE 1, showing a cam follower actuating mechanism applied to the valve mechanism unit.

Referring now more particularly to FIGURES 10 and 11 of the drawings, there is shown therein a cam follower actuating mechanism, generally indicated at 178, which can be conveniently utilized with the basic valve mechanism unit 10 of the present invention. The cam follower actuating mechanism 178 includes a cam follower in the form of a ball 180 which is arranged to be engaged by a suitable cam (not shown). The cam follower ball 180 is mounted within a socket 182 formed in a ball receiving member 184 which may be of any suitable material, as, for example, plastic or the like. The member 184 is mounted on the rocker arm assembly by means of an elongated stud 186 which extends through the member 184 and has its lower end in engagement with the interiorly threaded opening 124 formed in the left hand arm portion 118 of the rocker arm member, as shown in FIGURE 10. Mounted in the surrounding relation to the stud 186 is a spacer sleeve 188, the lower end of which engages the upper surface of the arm portion 118 and the upper end of which engages the lower surface of a generally Z-shaped bracket 190 having one end mounted below the member 184 and apertured to receive the stem and its opposite end arranged to engage the upwardly extending socket portion 128 of the rocker arm member and apertured to receive a stud 192 which is engaged within the interiorly threaded opening 130.

A helical spring 194 is provided for resiliently urging the rocker arm assembly 102 in a clockwise direction, as viewed in FIGURE 10. The spring is positioned so that its lower end is disposed in surrounding relation to the projection 106 associated with left hand valve member 40, as shown in FIGURE 10, and the upper end of the spring engages the lower surface of the associated arm portion 118 of the rocker arm member 114. As before, a suitable housing or cover member 196 of plastic material is provided. The cover 196 is secured to the upper surface of the valve body by any suitable means, such as fastening elements 198 extending through the cover and into the openings 108. The central portion of the cover is apertured, as at 200, to permit the cam follower to extend upwardly therethrough.

Operation

As indicated above, the basic valve mechanism unit 10 of the present invention is arranged to be utilized with suitable adapter plates which provide appropriate conduit connections for the particular installation. Moreover, the rocker arm assembly 102 is arranged to receive various instrumentalities through which the basic valve mechanism unit 10 may be actuated in accordance with the requirements of the particular installation. It will be understood that in all of the installations, a source of fluid under high pressure, either gas or liquid, is communicated with the high pressure port 48 and a source of fluid under low pressure is communicated with the low pressure port 52. The terms high and low pressure are relative, and therefore, comprehend within their meaning the utilization of a pump to supply fluid to the high pressure port at a value above atmospheric pressure and a simple sump communicated with the low pressure port or the provision of a vacuum pump communicating with the low pressure port to provide a source of fluid at a pressure less than atmospheric pressure and a simple sump connected with the high pressure port. Of course, where the fluid utilized is air, it is often not necessary to connect a conduit to the low pressure port where a compressor is utilized or a conduit to the high pressure port where an air vacuum pump is utilized, since the respective ports may simply exhaust to atmosphere.

It will also be understood that the working ports 50 are connected through suitable conduit to any fluid operated instrumentality as, for example, a double acting fluid operated piston and cylinder unit. Where the valve mechanism is arranged to control relatively high pressures, for example, above 300 p.s.i., it is preferable to construct the valve members 20 of a plastic material such as nylon, Teflon, Delrin, or the like. In this case, the plastic material provides a plastic surface for engaging the seat 18 and a plastic seat 26 to be engaged by the valve element 46. For lower pressure applications, for example, pressures up to 300 p.s.i., it is preferable to construct the valve members 20 of metal as, for example, a suitable aluminum alloy or the like, as indicated at 202 in FIGURE 12. In this case, it is preferable to provide an insert 204 on the inner end of the metallic valve member 202, which is of a resilient material, such as rubber or the like, thus providing a resilient surface for engaging the valve seat 18 and a resilient valve seat 26 for engagement by the valve element 46.

In the normal operation of the basic valve mechanism unit 10, connected in the manner indicated above, and having a simple manual control lever 132 connected therewith to actuate the same, as shown in FIGURE 1, the lever will be normally resiliently biased by the springs 38 into a flow preventing or null position, such as shown in FIGURE 1. The engagement of the surfaces 24 of the valve members 20, with their respective valve seats 18, serves to prevent flow of fluid from the high pressure port 48 to the working ports 50 and the engagement of the valve elements 46 of the valve members 40 with the valve seats 26 of the valve members 20 serves to prevent flow of fluid from the working ports 50 to the low pressure port 52. When it is desired to actuate the working instrumentality, the actuating lever is moved to pivot the rocker arm assembly 102 in either a counter-clockwise or clockwise direction, depending upon the particular movement of the working instrumentality desired. For example, when the lever arm is moved to the right, as shown in FIGURE 1, the right hand valve member 40 is moved downwardly, which in turn moves the associated valve member 20 downwardly through the engagement of the valve element 46 with the valve seat 26, thus compressing the associated spring 38. It will be seen that this downward movement of the cooperating right hand valve members 40 and 20 will move the surface 24 of the valve member 20 downwardly away from the valve seat 18, thus communicating the high pressure port 48 with the right hand working port 50. It will also be noted that during this movement the right hand working port 50 is closed from communication with the low pressure port through the engagement of the associated valve element 46, with the associated valve seat 26.

Simultaneously with the downward movement of the right hand valve members indicated above, the left hand valve member 40 will move upwardly as a result of the pressure within the left hand working port 50 acting on the downwardly facing surface of the valve member 40 adjacent the upper end of the stem 44. The upward movement of the left hand valve member 40 communicates the left hand working port 50 with the low pressure port 52 through the passageway 22 in the left hand valve member 20. It will also be noted that spring 38 serves to retain the left hand valve member 20 in its uppermost position with the surface 24 thereof in engagement with the associated valve seat 18 thus closing communication of the high pressure port 48 with the left hand working port 50.

It will be understood that when the control lever 132 is moved in the opposite direction past the null position, as, for example, to the left, as shown in FIGURE 1, the reverse operation will occur so that the left hand working port 50 is communicated with the high pressure port 48 and the right hand working port 50 is communicated with the low pressure port 52.

While in normal operation the basic valve mechanism unit will be utilized so that when the rocker arm assembly is disposed in its central position the valve members will be maintained in the flow preventing or null position shown in FIGURE 1, it will be understood that the shanks 126 of the bolts may be adjusted to give different results when the rocker arm assembly is disposed in such central position. For example, the heads 122 of both bolts may be adjusted downwardly from the position shown in which case the high pressure port 48 will be communicated with both working ports 50 when the rocker arm assembly is disposed in its central position. Conversely, by adjusting the heads 122 of both bolts upwardly from the position shown, the low pressure port 52 will be communicated with both working ports 50 when the rocker arm assembly is disposed in its central position.

A significant advantage of the present valve mechanism unit construction is that the valve members 20 are adapted to move away from the valve seats 80 in response to a pressure in the high pressure port 48 in excess of related pressure. It is contemplated that the various flow restricting ports and openings within the valve mechanism unit 10 will be formed of a desired size in accordance with the rated capacity of the valve for a particular application. The above-mentioned feature of the unit insures that the valve mechanism will at all times be effectively utilized and not employed in installations where pump pressures greatly in excess of those of rated capacity are used. To accomplish this result, the strength of the springs 38 is chosen so that a pressure within the high pressure port 48 slightly in excess of rated pump pressure acting on the resultant upwardly facing annular surface provided on the valve members 20, that is, the upwardly facing surface provided by the recess 54 plus the extremity of the annular surface 24 extending outwardly from the seat 18, will have the effect of depressing the same, thus opening all of the valve seats. It will also be noted that the above-mentioned resultant upwardly facing surface of the valve members 20 results in a lessening of the force required to move the valve members 20 downwardly as the pressure in the high pressure port 48 increases. This feature is important where constant force output actuating mechanisms are employed, such as the solenoids previously described.

The single solenoid actuating mechanism 136 is utilized where it is not necessary to have the valve mechanism normally disposed in its null position. Thus, the spring 154 of the single solenoid actuating mechanism 136 which is operable to resiliently bias the rocker arm assembly 102 in a clockwise direction, as viewed in FIGURE 8, is of a strength to overcome the force of spring 38 associated with the right hand valve member 20. The spring 154, therefore, normally maintains the valve mechanism in a position wherein the right hand working port is communicated with the high pressure port and the left hand working port is communicated with the low pressure port. It can be seen that when the solenoid 144 is energized, plunger 148 will move to the left, as shown in FIGURE 8, thus pivoting the rocker arm assembly in a counterclockwise direction to its opposite limiting position wherein the left hand working port is communicated with the high pressure port and the right hand working port is communicated with the low pressure port.

The dual solenoid actuating assembly 158, shown in FIGURE 9, is utilized where it is desired to have the basic valve mechanism unit normally disposed in its null position and electrically actuated in either direction. With the dual solenoid actuating mechanism 158, springs 38 will serve to normally bias the cooperating valve members into their null position in the same way, as indicated above with respect to the lever actuating shown in FIGURE 1. When it is desired to effect a counterclockwise pivotal movement of the rocker arm assembly to communicate the right hand working port with the high pressure port and the left hand working port with the low pressure port, the left hand solenoid is energized. Conversely, the right hand solenoid is energized to effect a counterclockwise movement of the rocker arm assembly, as shown in FIGURE 9, to communicate the left hand working port with the high pressure port and the right hand working port with the low pressure port.

The cam follower actuating mechanism 178 is utilized where cam operation of the valve is desired, and it will be understood that the ball 180 will be normally engaged by a suitable cam surface in such operation. The spring 194 provided by the cam follower actuating mechanism 178 serves a purpose similar to the spring 154 of the single solenoid actuating mechanism 136. That is, the spring 194 is of a strength sufficient to overcome the force of the spring 38 associated with the right hand valve member 20 so that the rocker arm 102 will normally assume a limiting position in a clockwise direction, as viewed in FIGURE 10, where there is no cam surface acting on the ball 180. In this way, the cam follower ball is at all times resiliently maintained into contact with the cam surface.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In a valve mechanism the combination comprising a valve body having formed therein a longitudinally extending valve cavity and three parallel openings extending completely therethrough transversely with respect to said cavity and each communicating with the latter, said three openings constituting high pressure, low pressure and working ports; and valve means mounted within said cavity for movement into different positions to control the flow of fluid from said high pressure port to said working port and from said working port to said low pressure port, wherein the sides of said valve body through which said parallel openings extend include planar surface means adjacent the ends of said openings, the planar surface means on each side having a sealing element receiving annular groove formed therein surrounding the adjacent end of each of said openings.

2. In a valve mechanism the combination comprising a valve body having formed therein a longitudinally extending valve cavity and three parallel openings extending completely therethrough transversely with respect to said cavity and each communicating with the latter, said three openings constituting high pressure, low pressure and working ports; and valve means mounted within said cavity for movement into different positions to control the flow of fluid from said high pressure port to said working port and from said working port to said low pressure port, including plate means mounted on each side of said valve body through which said parallel openings extend, said plate means closing one end of each of said openings and providing a conduit engaging opening at the other end thereof.

3. In a valve mechanism, the combination comprising a valve body having formed therein a longitudinally extending valve cavity, three parallel openings extending completely therethrough transversely with respect to said cavity and each communicating with the latter, said three openings constituting high pressure, low pressure and working ports, and a first valve seat formed in said cavity between said high pressure and working ports; a first valve member longitudinally movable in said cavity, said first valve member having means thereon for engaging the valve seat in said cavity and a longitudinally extending passageway therein, a second valve seat formed in said first valve member in surrounding relation to said passageway; a second valve member mounted for longitudinal movement with respect to said first valve member and having means for engaging the valve seat on the latter; and means extending transversely with respect to said openings and outwardly of said valve body for effecting a relative longitudinal movement in either direction between said valve body and said second valve member, said motion effecting means being operable in one direction to communicate said working port with said high pressure port, said motion effecting means being operable in the opposite direction to communicate said working port with said low pressure port through said passageway.

4. In a valve mechanism, the combination comprising a valve body having formed therein a longitudinally extending bore, a counterbore in one end of said bore defining with the bore an annular shoulder providing a first valve seat, and three parallel openings extending completely therethrough transversely with respect to said bore, one of said openings communicating with said bore adjacent said valve seat and constituting a working port, another of said openings communicating with said counterbore adjacent said valve seat and constituting a high pressure port, the other of said openings communicating with said counterbore in spaced relation to said high pressure port and constituting a low pressure port; a first valve member slidably mounted in said counterbore between said valve seat and said low pressure port, the end of said first valve member adjacent said valve seat having an annular surface for engaging the latter, said first valve member having a passageway extending longitudinally therethrough providing a second valve seat; a second valve member slidably mounted in said bore and extending outwardly therefrom, said second valve member having an element on the inner end portion thereof for engaging said second valve seat; and spring means carried by said valve body within said counterbore resiliently urging said first valve member in a direction to engage the annular surface thereof with said first valve seat, said second valve member being movable inwardly with said element in engagement with said second valve seat to move said first valve member away from said first valve and thereby communicate said high pressure port with said working port and being movable outwardly with the annular surface of said first valve member in engagement with said first valve seat to move said element away from said second valve seat to communicate said working port with said low pressure port.

5. The combination as defined in claim 4 wherein said valve body is made of metal and wherein said first valve member is made of plastic.

6. The combination as defined in claim 4 wherein said valve body is made of metal and wherein said first valve member is made of metal and has an insert of resilient material formed on the inner end thereof which defines said annular surface and said valve seat.

7. The combination as defined in claim 4 wherein the sides of said valve body through which said openings extend are planar adjacent said openings, and wherein a pair of outer adapter plates are fixedly mounted in abutting relation to said planar sides, said adapter plates closing one end of each of said ports and providing a conduit engaging opening at the opposite end thereof.

8. The combination as defined in claim 7 wherein said planar sides are formed with an annular groove surrounding the adjacent end of each of said ports and wherein an annular sealing element is disposed in each of said annular grooves in engagement with the adjacent surface of the associated adapter plate.

9. In a valve mechanism, the combination comprising a valve body having formed therein a pair of parallel valve cavities extending longitudinally therein, a high pressure port extending completely through said valve body between said cavities transversely with respect thereto and in communication therewith, a parallel low pressure port extending completely through said valve body between said cavities transversely with respect thereto and in communication therewith, and a parallel working port for each cavity extending completely through said valve body transversely with respect to said cavities and in communication with one of said cavities; and valve means mounted within said cavities for movement into different positions to control the flow of fluid from said high pressure port to said working ports and from said working ports to said low pressure port.

10. The combination as defined in claim 9 wherein said valve means includes parallel members extending from said parallel cavities outwardly of said valve body and a rocker arm member pivotally mounted on said valve body between said outwardly extending members having opposed arm portions engaging the outwardly extending ends of said members and an intermediate socket portion for receiving actuating means for said rocker arm member.

11. The combination as defined in claim 9 wherein the sides of said valve body through which said ports extend include planar surface means adjacent the ends of said ports, the planar surface means on each side having a sealing element receiving annular groove formed therein surrounding the adjacent end of each of said ports.

12. The combination as defined in claim 9 including plate means mounted on each side of said valve body through which said ports extend, said plate means closing one end of each of said ports and providing a conduit engaging opening at the other end thereof.

13. In a valve mechanism, the combination comprising a valve body having formed therein cavity means, a pair of annular valve seats in said cavity means, high pressure port defining means extending completely through said body in a direction transverse to said cavity means and communicating with the latter on one side of each of said valve seats, a working port associated with each of said valve seats extending completely through said body in a direction parallel with said high pressure port defining means and communicating with the other side of the associated valve seat within said cavity means, low pressure port defining means extending completely through said valve body in a direction parallel with said high pressure port defining means and communicating with said cavity means on the other side of each of said valve seats; a first pair of valve members longitudinally movable in said cavity means, each of said first valve members having means thereon for engaging a valve seat in said cavity means and a longitudinally extending passageway therein, each of said passageways having a valve seat formed therein; a second valve member for each of said first valve members having means for engaging the valve seat formed in the passageway thereof; and means for effecting a relative longitudinal movement in either direction between said valve body and said second valve members, said motion effecting means being operable in one direction to communicate the working port associated with one of said valve seats in said cavity means with said high pressure port defining means and the other of said working ports with said low pressure port defining means through the associated passageway, said motion effecting means being operable in the opposite direction to communicate said other working port with said high pressure port defining means and said one working port with said low pressure port defining means through the associated passageway.

14. In a valve mechanism, the combination comprising a valve body having a pair of parallel bores extending longitudinally therethrough, each of said bores having a counterbore formed in one end thereof defining with the associated bore an annular shoulder providing a first valve seat; a first valve member slidably mounted in each of said counterbores, each of said first valve members having an end surface for engaging the associated first valve seat, a longitudinal passageway extending therethrough, and a second valve seat in said passageway adjacent said first valve seat engaging surface; plug means in the outer end of each counterbore; spring means within each counterbore between the associated plug means and first valve member for resiliently urging the latter toward the associated first valve seat; and a second valve member slidably mounted in each of said valve body bores and having an annular surface for engaging the associated second valve seat, said valve body having formed therein a high pressure port extending transversely completely therethrough between said counterbores and communicating with the latter adjacent the first valve seats therein, a parallel low pressure port extending transversely completely therethrough between said counterbores and communicating with the latter between the first valve members and plug means therein, and a parallel working port for each bore extending transversely completely therethrough and in communication with one of said bores adjacent the associated first valve seat thereof.

15. The combination as defined in claim 14 wherein the sides of said valve body through which said ports extend are planar adjacent said ports and wherein a pair of outer adapter plates are fixedly mounted in abutting relation to said planar sides, said adapter plates closing one end of each of said ports and providing a conduit engaging opening at the opposite end thereof.

16. The combination as defined in claim 15 wherein said planar sides are formed with an annular groove surrounding the adjacent end of each of said ports and wherein an annular sealing element is disposed in each of said annular grooves in engagement with the adjacent surface of the associated adapter plate.

17. The combination as defined in claim 14 wherein each of said first valve members has its outer periphery adjacent the inner end thereof relieved and an annular groove formed in the periphery thereof in spaced relation to the relieved portion thereof and wherein an O-ring seal is disposed in each of said grooves in engagement with the interior periphery of the associated counterbore.

18. The combination as defined in claim 17 wherein each of said first valve members is made of plastic, the first valve seat engaging surface thereof being an outwardly facing outer frusto-conical surface and the second valve seat thereof being an inwardly facing inner frusto-conical surface.

19. The combination as defined in claim 17 wherein each of said first valve members is made of metal and has an insert of resilient material on the inner end thereof defining said first valve seat engaging surface and said second valve seat, the first valve seat engaging surface of said insert being an outwardly facing outer frusto-conical surface and the second valve seat of said insert being an inwardly facing inner frusto-conical surface.

20. The combination as defined in claim 14 wherein each of said second valve members comprises a cylindrical portion slidably mounted in said bore and extending outwardly therefrom, said cylindrical portion having a stem extending from the inner end thereof and a segmental spherical element on the end of said stem providing said second valve seat engaging annular surface.

21. The combination as defined in claim 20 wherein said valve body includes lug means adjacent the outwardly extending cylindrical second valve member portions, a rocker arm member pivotally mounted on said lug means, said rocker arm member including opposed arm portions extending outwardly from the pivotal axis of said arm member disposed in engagement with the outer extremities of said cylindrical portions and an intermediate socket portion having means therein for receiving actuating means for said rocker arm member.

22. The combination as defined in claim 21 wherein said socket portion has a control lever fixedly mounted thereon.

23. The combination as defined in claim 21 wherein said socket portion has a solenoid plunger engaging member fixedly mounted thereon, a solenoid mounted on said valve body having a plunger for engaging said solenoid plunger engaging member to pivot said rocker arm member in one direction, and spring means surrounding the outwardly extending end portion of one of said cylindrical second valve member portions between said valve body and the associate rocker arm member arm portion for resiliently urging said rocker arm member to pivot in the opposite direction.

24. The combination as defined in claim 21 wherein said socket portion has a solenoid plunger engaging member fixedly mounted thereon, and a pair of opposed solenoids mounted on said valve body and having plungers for engaging said solenoid plunger engaging member on opposite sides thereof to pivot said rocker arm member in opposite directions.

25. The combination as defined in claim 21 wherein said socket portion has one end of a mounting bracket fixedly mounted thereon, a mounting member fixedly mounted at one end on one of said rocker arm member arm portions and connected at its other end to the other end of said mounting bracket, a cam follower carried by said mounting member and said mounting bracket, and spring means surrounding the outwardly extending end of the cylindrical second valve member portion associated with said one arm portion between the latter and said valve body.

26. A valve mechanism comprising a valve body having formed therein a pair of parallel cavities each having an annular valve seat formed therein, a high pressure port communicating with one side of each of said valve seats within said cavities, a working port associated with each of said valve seats communicating with the other side of the valve seat within the associated cavity; a first pair of valve members longitudinally slidable in said cavities, each of said first valve members having means thereon for engaging a valve seat and a longitudinally extending passageway therein, each of said passageways having a valve seat formed therein; a second valve member for each of said first valve members extending from the associated cavity outwardly of said valve body and having means for engaging the valve seat formed in the passage of the associated first valve member; and rocker arm means pivotally mounted on said valve body between the outwardly extending second valve members for effecting relative longitudinal movement of the latter in either direction, said rocker arm means including a pair of opposed arm portions engageable with the outwardly extending ends of said second valve members and an intermediate socket portion for receiving actuating means for pivoting said rocker arm means, said rocker arm means being operable in response to pivotal movement in one direction to communicate the working port associated with the valve seat in one of said cavities with said high pressure port and the other of said working ports with the associated first valve member passageway, said rocker arm means being operable in response to pivotal movement in the opposite direction to communicate said other working port with said high pressure port and said one working port with the associated first valve member passageway.

27. A valve mechanism as defined in claim 26 wherein said socket portion has a control lever fixedly mounted thereon.

28. A valve mechanism as defined in claim 26 wherein said socket portion has a solenoid plunger engaging member mounted thereon, a solenoid mounted on said valve body having a plunger for engaging said solenoid plunger engaging member to pivot said rocker arm means in one direction, and spring means surrounding the outwardly extending end portion of one of said second valve members between said valve body and the associated rocker arm portion for resiliently urging said rocker arm means to pivot in the opposite direction.

29. A valve mechanism as defined in claim 26 wherein said socket portion has a solenoid plunger engaging member mounted thereon, and a pair of opposed solenoids mounted on said valve body and having plungers for engaging said solenoid plunger engaging member on opposite sides thereof to pivot said rocker arm means in opposite directions.

30. A valve mechanism as defined in claim 26 wherein said socket portion has one end of a mounting bracket fixedly mounted thereon, a mounting member fixedly mounted at one end on one of said rocker arm portions and connected at its other end to the other end of said mounting bracket, a cam follower carried by said mounting member and said mounting bracket, and spring means surrounding the outwardly extending end of the second valve member associated with said one arm portion between the latter and said valve body.

31. A valve mechanism comprising a valve body having formed therein a pair of parallel valve cavities, high and low pressure port means communicating with both of said cavities, and working port means communicating with each of said cavities, valve means longitudinally movably mounted in each of said cavities for controlling the flow of fluid from said high pressure port means to the associated working port means and from the associated working port means to said low pressure port means, the valve means for each of said cavities including a portion extending from the associated cavity longitudinally outwardly of said valve body, a rocker arm member pivotally mounted on said valve body intermediate said outwardly extending valve means portions, said rocker arm member including opposed arm portions extending transversely outwardly from the pivotal axis of said rocker arm member, means longitudinally adjustably mounted on each arm portion and connected with the associated outwardly extending valve means portion for moving the latter in response to the pivotal movement of said rocker arm member, said rocker arm member also including an intermediate socket portion for receiving an actuating means for pivoting said rocker arm member between a first limiting position wherein said valve means is operable to permit flow of fluid from the high pressure port means to the working port means associated with one cavity and from the working port means to the low pressure port means associated with the other cavity and a second limiting position wherein said valve means is operable to permit flow of fluid from the high pressure port means to the working port means associated with said other cavity and from the working port means to the low pressure port means associated with said one cavity, said rocker arm member being pivotable into an intermediate position wherein said longitudinally adjustable means is operable to selectively adjust said valve means to prevent flow of fluid in both cavities, permit flow of fluid from said high pressure port means to the working port means of both cavities, or permit flow of fluid from the working port means of both cavities to the low pressure port means.

References Cited in the file of this patent

UNITED STATES PATENTS

| | | |
|---|---|---|
| 453,199 | Schmidt | Nov. 17, 1927 |
| 1,797,591 | Sartakoff | Mar. 24, 1931 |
| 2,322,740 | Vanderzee et al. | June 22, 1943 |
| 2,427,788 | Kehle | Sept. 23, 1947 |
| 2,475,298 | Sloane | July 5, 1949 |
| 2,477,237 | Carr | July 26, 1949 |
| 2,651,324 | Hodgson et al. | Sept. 8, 1953 |
| 2,661,017 | Geiger | Dec. 1, 1953 |
| 2,700,986 | Gunn | Feb. 11, 1955 |
| 2,725,890 | Kanuch | Dec. 6, 1955 |
| 2,834,368 | Gray | May 13, 1958 |
| 2,970,571 | Pecchenino | Feb. 7, 1961 |
| 2,971,090 | Piet et al. | Feb. 7, 1961 |

FOREIGN PATENTS

| | | |
|---|---|---|
| 24,572 | Great Britain | Mar. 3, 1894 |
| 16,061 | Great Britain | Oct. 2, 1902 |
| 484,124 | Great Britain | May 2, 1938 |
| 548,175 | Great Britain | Sept. 29, 1942 |
| 799,228 | Great Britain | Aug. 6, 1958 |